Jan. 9, 1940.　　　C. WALDEYER　　　2,186,052
OPTICAL PROJECTION DEVICE
Filed Aug. 23, 1938　　　2 Sheets-Sheet 2

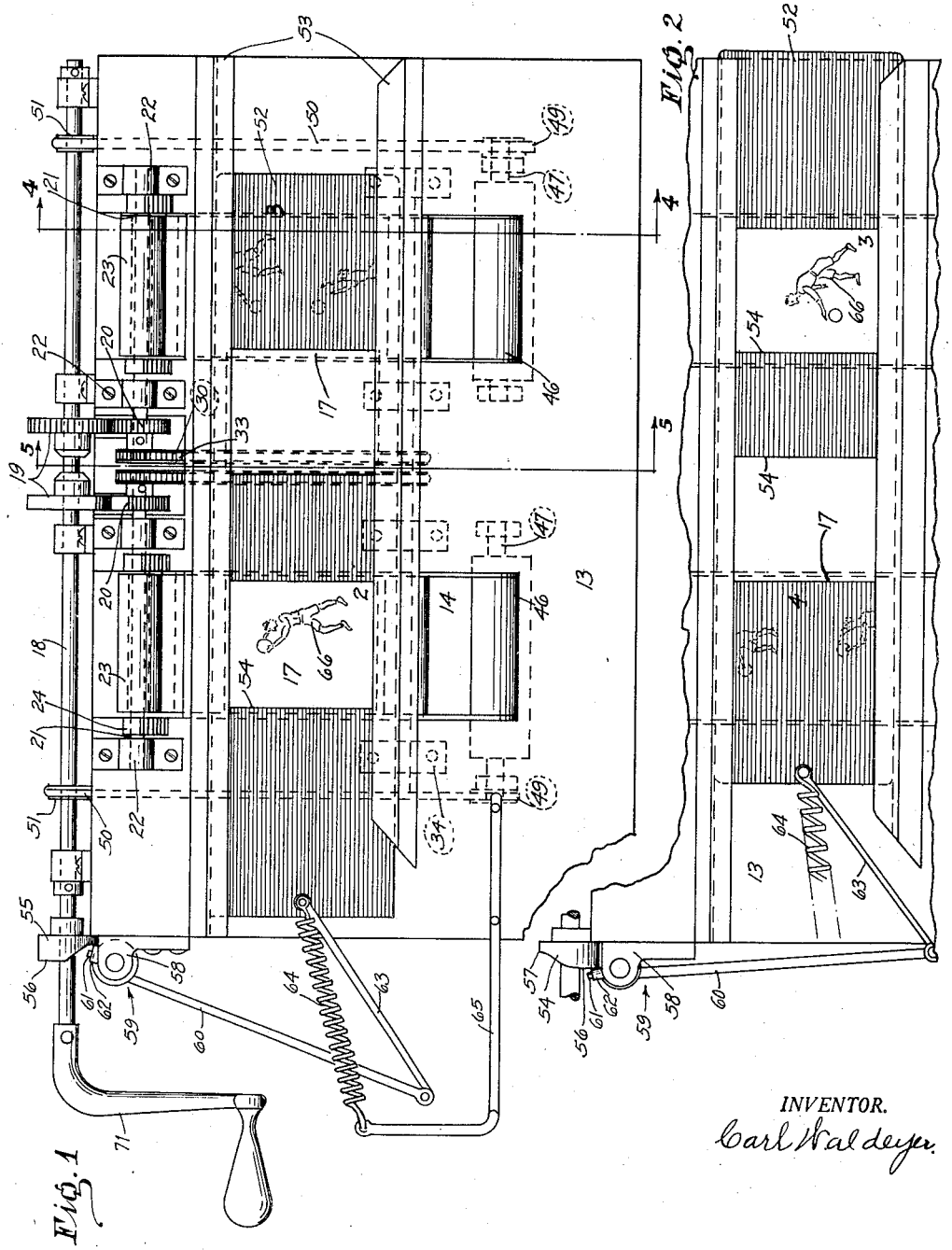

INVENTOR.
Carl Waldeyer

Patented Jan. 9, 1940

2,186,052

UNITED STATES PATENT OFFICE 2,186,052

OPTICAL PROJECTION DEVICE

Carl Waldeyer, San Francisco, Calif.

Application August 23, 1938, Serial No. 226,318

2 Claims. (Cl. 88—16.6)

My invention relates to devices for projecting moving illuminated pictures or sets of characters upon a screen or other suitable surface.

One important object of the invention is to construct an optical projection device so that it will be unnecessary to employ transparent films in connection therewith, and so that ribbons of opaque and less expensive material may be substituted, both sides of such ribbons being adapted to have sets of characters arranged thereon for projection purposes, in order to effect an economical operation of the device.

Another object is to provide an optical projection device with two or more such ribbons and arrange upon them consecutively and progressively from one ribbon to another sets of characters which may be produced by means other than a photographic process, and to project the image of the characters successively upon a suitable surface by the aid of reflected light so that all of the projected images will appear within the same area on the projection surface.

An important object is also to construct an optical projection device and so arrange the light means therefor that the images of moving pictures may be projected upon a suitable projection surface, and the projection surface may be constantly illuminated during the operation of the device, thus avoiding such a flickering of light as is common in devices heretofore constructed, and thus relieving the spectators of the eye strain otherwise imposed upon them.

An additional object is to construct an optical projection device so that it is adapted to project upon a suitable projection surface images in the actual colors of the characters upon the ribbons, thus providing a practical means for vividly coloring moving pictures and thereby particularly adapting the device for use in daylight exhibitions.

A further object is to provide novel means for feeding the ribbons and for holding them under tension so as to prevent their wrinkling or breakage, or any other damage to them, and also to assure the projection of the sets of characters in their intended order.

Still further objects and advantages of my invention will be understood from the following detailed description, taken in conjunction with the accompanying drawings, in which is illustrated a preferred embodiment of the invention and in which:

Figure 1 is a front elevation of the operative mechanism of my device and the mounting means therefor removed from its casing, the view showing the shutter moved so as to expose a picture on one momentarily motionless ribbon and to shut off from exposure a second ribbon, which is caused to move during the motionless period of the first ribbon, and a preceding picture on the second ribbon being shown as moving from the exposure position, while a consecutive picture on the second ribbon is shown as moving toward its position for exposure;

Figure 2 is a broken front elevation, similar to Figure 1, but with the second ribbon momentarily motionless and moved to the exposure position of the picture shown in Figure 1 as moving towards its exposure position, and with the shutter moved so as to expose the exposure-positioned picture on the second ribbon and to shut off from exposure the first ribbon, which is caused to move during the motionless period of the second ribbon, the picture of the latter, shown in Figure 1 as being in the exposure position, being in this view shown as moving from that position, while a picture consecutive to the exposed picture on the second ribbon is shown as moving toward its position for exposure;

Figure 6:
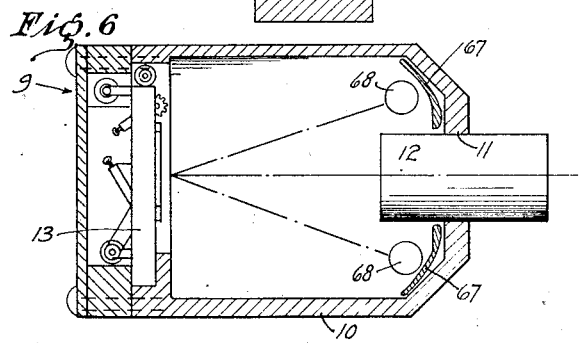
Figure 7:
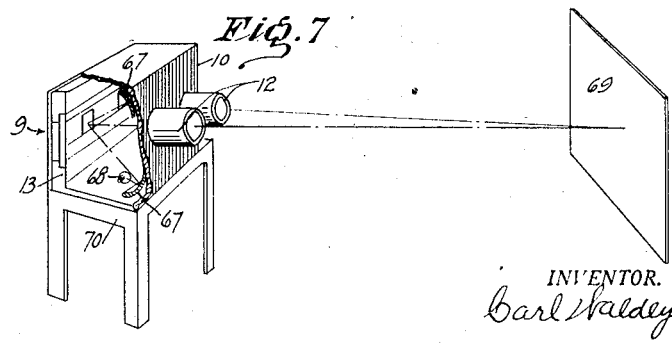

Figure 6 is a side elevation of the device on a reduced scale, the casing and other parts being taken in section along a vertical, median plane longitudinally of one of the lenses; and Figure 7 is a perspective view of the device on a still more reduced scale, a stand therefor and a screen at a distance therefrom, the casing being partly broken, and the focusing upon the screen of the light rays that pass through the lenses, and the reflection of the rays from one of the reflectors to one of the ribbons being indicated by dot-and-dash lines.

My invention as a whole is indicated by the numeral 9 and includes a casing 10 shown in Figures 6 and 7. In the front of the casing I provide a plurality of openings 11, in each of which is fixed a lens 12, and back of the lenses is fixed in the casing a framework 13, which preferably has formed therein back of each lens a suitable passageway 14, and in each passageway a backing element 15 is suitably secured to the framework or made integral therewith so as to be set back from the front face of the framework in order to form substantially vertical guides 16 on the sides of each backing element. A ribbon 17, preferably of an opaque material, is adapted to be guided in the respective guides on and over the respective backing element, and preferably on top of the framework 13 is rotatably mounted an operating shaft 18, extending transversely of the ribbons and having secured thereon intermittent gears 19, which are adapted to respectively engage other intermittent gears 20 respectively secured on aligned shafts 21. Each of these shafts is rotatably mounted at the ends in bearings 22 on the framework at the top and in front thereof, so that an intermittent motion is imparted to these shafts when the shaft 18 is rotated.

A roller 23 of an elastic, anti-friction material, such as rubber or a rubber composition, is secured upon each of the shafts 21. Besides extending through the bearings 22, each of the shafts 21 also extends through other bearings, each of which is at one end of an elongated housing 24, and each of the housings is mounted in a recess which is at the side of the passageway 14 and extends obliquely downward from the front face to the rear face of the framework. Within each housing is a slidable bearing block adapted to rotatably receive therein the end of a shaft 25, upon which is secured a roller 26, similar to the rollers 23, each of the housings 24 being open at its side so as to allow a longitudinal movement of the bearing block therein. The end of each housing opposite to the end provided with the bearing is threaded and has screwed therein a screw 27, the inner end of which has pivotally secured thereto a disk 28, and between the disk and the bearing block is secured a coiled spring 29, so that, by the adjustment of the screws 27, the springs 29 may be contracted between the respective bearing blocks and the disks and thereby the rollers 26 will be caused to bear against the respective rollers 23 with any desired pressure.

Upon each of the shafts 21 and at the end thereof is secured a sprocket wheel 30, and other sprocket wheels 31, which are secured upon aligned shafts 32 parallel with the shafts 21, are in engagement with the respective sprocket wheels 30 by means of sprocket chains 33. These shafts 32 are at their ends rotatably mounted in bearings 34 on the back face of the framework 13, so that the shafts are preferably somewhat below the backing element 15, and the shafts have rollers 35, similar to the rollers 23, mounted thereon, with the difference that the rollers 35 preferably are a trifle larger in diameter than the rollers 23 for a purpose hereinafter explained. Like the shafts 21, the shafts 32 also extend through bearings at the ends of elongated housings 36, similar in construction to the housings 24 and held in engagement with the inclined surfaces of respective ribs 37 on the back face of the framework 13 by any suitable means, such as straps 38. The slidable bearing blocks in the respective housings 36 are adapted to rotatably receive therein the respective ends of shafts 39, upon each of which is secured a roller 40, similar to the rollers 26. In the respective housings 36 the screws 41 serve to adjust the tension of the respective springs 42, so that the pressure with which the rollers 40 will bear against the respective rollers 35 may be adjusted to any desired degree in the same manner as the pressure of the rollers 26 against the respective rollers 23 is adjusted.

The respective pairs of upper rollers 23, 26 and lower rollers 35, 40 are so arranged that a ribbon 17 may be fed first between the upper rollers and down in front of the backing element 15 and between the guides 16 to and between the lower rollers, and the tension of the springs 29 and 42 is relatively adjusted so that the pressure of the roller 23 exerted upon the ribbon against the roller 26 is somewhat greater than the pressure of the roller 40 upon the ribbon against the roller 35. Therefore, as the lower roller 35 is rotated a little faster than the upper roller 23, the ribbon will be held tightly between the respective pairs of rollers, and the forward feeding of the ribbon will be positive, while, on account of the greater tension upon the ribbon between the upper rollers 23 and 26, the ribbons will be pulled taut over the backing element 15 by the lower rollers 35 and 40 and at the same time will be allowed to slip therebetween so that wrinkling or breaking of the ribbon, or any other damage thereto, is hereby prevented.

For each ribbon 17 is provided an upper reel 43, which is mounted upon a shaft 44 preferably removably supported in arms 45, and the arms are secured on the back face of the framework 13 so as to allow the ribbon on the reel to be fed between the respective upper rollers 23 and 26. A lower reel, 46 is also provided for each ribbon, and each of the reels 46 is secured to a shaft 47, which may be removably and rotatably secured at its ends in arms 48, and the arms 48 may for this purpose be of a springy material so that the shaft 47 can be easily slipped in and out therefrom. In addition to the reels 46, each shaft 47 has secured thereon a pulley 49 adapted to be driven by a belt 50 from another pulley 51 secured to the operating shaft 18. This belt is preferably of an elastic nature and engages the pulleys 49 and 51 with a tension only sufficient to feed the respective ribbon from the respective lower rollers 35 and 40, so that, when the shaft 18 is rotated and the upper and the lower rollers for one ribbon and therewith also the respective shaft 47 are inoperative, the belt will slip over the respective pulleys 49 and 51 and thereby prevent damage to the momentarily inoperative ribbon.

The gears 19 and 20, by which the intermittent operation of the ribbons 17 is effected, are shown as being of such construction and in such respective engagement with each other that upon the complete revolution of the operating shaft the driving intermittent gear 19 causes the respective driven intermittent gear 20 also to make one complete revolution, but it is understood that I do not desire to confine myself to this particular arrangement, since it is evident that intermittent gear connections may be provided by which the driven intermittent gears 20 will be caused to make more than one revolution for each revolution of the shaft 18. It is also obvious that other forms of intermittent gear connections than those shown in the drawings may be used with the same result, and I therefore wish it fully understood that these gears in the particular form shown are merely illustrative and have no other significance.

It is understood that the diameter of the rollers 23, on shaft 22, and operated by the driven intermittent gear 20, regulates and establishes the length of ribbon that is fed forward by the respective complete revolutions of intermittent gear 20, thus establishing the length of the frame of the respective ribbons 17. It is also understood that the length of frame on the respective ribbons 17 may be arranged as desired by substituting rollers 23 of required diameter. It is also understood that ribbons of any width desired may be used, so that pictures may be drawn or imprinted on same with sufficient detail.

In front of the ribbons 17 is a shutter 52, which is slidably mounted in guides 53, secured to the front face of the framework 13. This shutter has therein openings 54, each adapted to register respectively with one ribbon in front of the backing element 15, and the arrangement of the openings being such that only one of them at a time is adapted to be in the registering position. A cam wheel 55, provided with lateral cam faces 56 and 57, is secured to the shaft 18, preferably at one end of the framework 13, and pivotally mounted in bearings 58 which are secured to the end of the framework, is a lever 59, comprising a long downward extending arm 60 and a short arm 61 extending upward and having thereupon rotatably mounted a roller 62, which is adapted to contact the cam faces 56 and 57. Pivotally connected at one end with the end of the long lever arm 60 and at its other end pivotally connected with the shutter is a link 63, and a coil spring 64 is at one end connected with the shutter, while the other end of the spring is supported by a somewhat hook-shaped arm 65, secured to the framework and extending therefrom so as to hold the coil spring 64 under a suitable tension.

It should be observed that the cam face 56 on the cam wheel 55 extends farther laterally than the cam face 57 and that the spring 64, by means of its connection with the arm 65 and the shutter 52 and the shutter's connection by the link 63 with the long arm 60 of the lever 59, tends to hold the roller 62 in continual contact with the cam faces 56 and 57. The lever 59, the link 63 and the spring 64 thus comprise means that operate in conjunction with the cam 55 for moving the shutter to or from the registering positions of the openings 54 with the respective ribbons 17 when the shaft is rotated.

For the purpose of illustration, only two ribbons 17, as well as gear connections and other parts for operating only such a number of ribbons, are shown in the drawings, it being obvious that additional intermittent gearing and other operating parts may be provided, if in further development work I should find it advantageous to employ more than two ribbons. These ribbons are, as before stated, preferably of an opaque material and have thereon sets of characters 66, which are in a predetermined spaced relation to one another on each ribbon and are arranged consecutively and progressively from one ribbon to another and may be drawn, printed or produced upon the ribbons by any other suitable method.

At the top and at the bottom within the casing 10 and at the front thereof are concave reflectors 67 so fixed that the rays from any suitable light means, such as electric lamps 68, secured back of the respective reflecting surfaces of the reflectors, will be reflected upon the area defined by the shutter openings 54, as shown in dot-and-dash lines in Figures 6 and 7, so that, when any of the openings is in the registering position with the respective ribbon, the respective set of characters 66 will be fully illuminated; and the arrangement of the openings 11, and the lenses 12 therein, is such that the light rays passing therethrough are focused at a predetermined distance from the ribbons, as is indicated by dot-and-dash lines in Figure 7. In Figure 7 is further shown how the light rays passing through the openings 11 and the lenses 12 are focused upon a suitable surface, which in this instance is represented as being the exposed surface of a screen 69.

Figure 3:
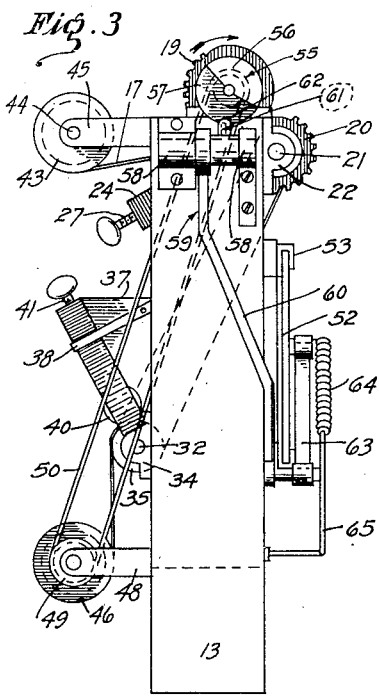
Figure 3 is a side elevation of the device as seen from the left in Figure 1, with the operating handle removed.
Figure 4:
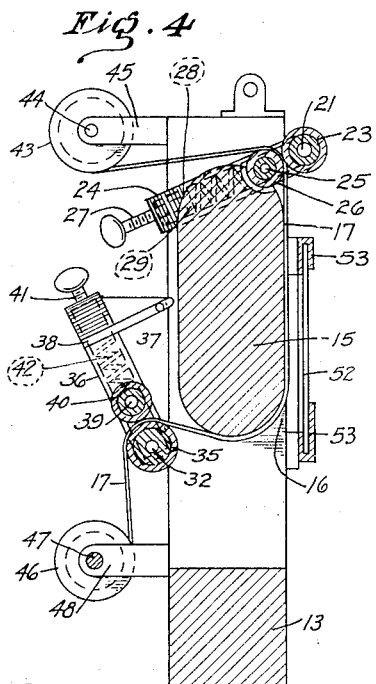
Figure 4 is a sectional elevation taken along the line 4—4 in Figure 1.
Figure 5:
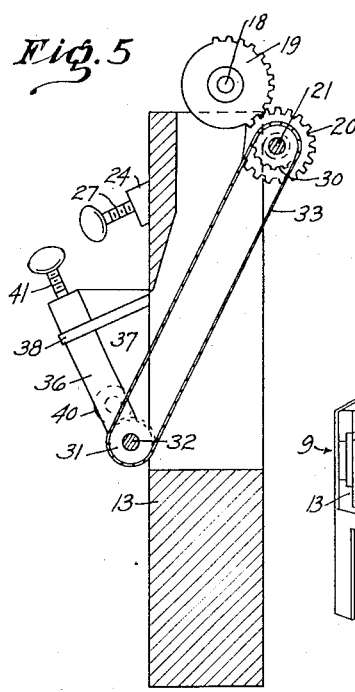
Figure 5 is a sectional elevation taken along the line 5—5 in Figure 1.

In operation my optical projection device 9 is placed upon a suitable stand or table 70, and the operating shaft 18 is rotated in the direction of the curved arrow shown in Figure 3. The operation may be effected either by manual means, such as a handle 71 secured to the shaft, or the shaft may have operative connection with suitable power means.

On the ribbons 17 the sets of characters 66 are in Figures 1 and 2 shown as four successive pictures of a player engaged in a game of basket ball. It being assumed that the shaft 18 is rotated, it would be observed that in the first picture, of which only the upper part appears under the lower part of the picture marked 3, on the ribbon 17 to the right, as shown in Figure 1, the player is seen in the act of running to catch the ball, but this picture as well as the picture 3 above it, is not exposed to view because the operating shaft has been turned so that the roller 62 on the short arm 61 of the lever 59 engages the cam face 57, thus causing the spring 64 to pull the shutter to its extreme position to the left and thereby moving the shutter to interposing position in front of these pictures, while at the same time the opening 54 to the left in the shutter registers with the picture, marked 2, on the ribbon to the left and exposes to view the consecutive picture of the player in the act of catching the ball. In this position of the shutter the intermittent gears 19 and 20 to the left are in their at-rest position, so that the ribbon to the left is also momentarily held at rest and the image of the picture, marked 2, is caused to be projected on the screen 69.

Meantime, the intermittent gears 19 and 20 to the right are rotating, as is understood from the positions of the pictures on the ribbon to the right, and thereby causing the first picture to travel downward and at the same time the picture, marked 3, to assume the exposure position. The picture 3 is consecutive to the picture 2 on the ribbon to the left and shows the ball player in the act of bouncing the ball up and down before throwing it. When the picture 3 assumes the exposure position, the roller 62 quickly comes into engagement with the cam face 56, so that the shutter is immediately moved to the registering position of the opening 54 to the right with the exposed picture 3 on the ribbon to the right. The intermittent gears 19 and 20 to the right are then in their at-rest position, and the ribbon to the right is thus momentarily held at rest, so that the image of the picture 3 is in its turn caused to be projected upon the screen, while the picture 2, which is moved downward and away from the exposure position, and together with the picture, marked 4, which approaches the exposure position, is shut off from view by the shutter. In this manner the pictures on the ribbons are alternately projected successively and progressively until the entire series of pictures on both ribbons have been projected and the ribbons have been wound up on the lower reels 46, which, as well as the upper reels 43, may then be removed to a suitable device for rewinding the ribbons upon the upper reels, with the pictures again in their projecting order.

In placing the ribbons between the upper and lower rollers for projecting the pictures, care, of course, must be taken so that the sets of characters 66 come in the proper positions for successive and alternate registering with the shutter openings 54. After once having been placed in the proper positions the ribbons will positively maintain their relation to each other, since the two pairs of rollers 23—26 and 35—40 positively prevent slipping of the ribbons therebetween.

It has been stated: "Motion pictures, as now produced, are based on the same principles as ordinary photographs and, in addition, on the phenomenon called persistence of vision."

It might be stated that my invention produces a type of motion pictures that is based on the same principles as the magic-lantern, with transparent slides, and the stereopticon, with opaque slides; is not dependent on photography, and is not so strictly dependent on, or restricted by, the phenomenon of the eye called persistence of vision.

Referring to the drawings: When the image of the picture, marked 2, is momentarily flashed on the constantly illuminated screen, 69, the shutter, 52, instantaneously shuts off the image of picture 2 from its exposed position on the screen, and as instantaneously exposes, on the screen, the image of picture 3.

If, then, the image of picture 3 is, after the smallest possible exposure period, cut off, and the image of picture 4 flashed on, the after-image of picture 2, not having had time to dissolve, will obscure, or blur, the image of picture 3, and the eye will have cleared only in time to allow an unrestricted view of the image of picture 4.

In operating the standard motion picture, now in use, the scientific description of the action described immediately above would be: "The chemical change of the first picture would persist in the eye while the cut-off blade of the shutter was hiding the second picture which was being jerked into place."

In my development, with its provision for a constant light on the screen, and its provision for the instantaneous presentation of the successive, alternate pictures on the screen, there is no need for the extra time provided by the after-image which is so necessary in the present method of producing motion pictures.

My invention, therefore, is not built around, nor so absolutely controlled by, that peculiarity of the eye called persistence of vision.

This after-image is still an advantage, in my mode of operation, in that it permits and requires a slower motion of the opaque ribbons, that may be used with my invention.

The slower motion of films, or ribbons, permitted and required, as described, allows me to use, in the present preferred embodiment of my invention, as described and illustrated herein, inexpensive paper ribbons, which could not be so successfully used if the high speed now required in the presentation of motion pictures was a requirement in the operation of my device.

In addition to the cheapest form of paper ribbons, parchment ribbons may also be used and, in a still further refinement of the operation, laminated Cellophane ribbons may be used.

For the purpose of illustration only the type of projectors necessary to produce motion pictures by reflection, with opaque ribbons, is shown in the drawings, it being obvious that transparent films could be used by adapting the mechanical movements of my invention to the type of motion picture projectors now in use, with direct lighting, instead of reflected lighting. My invention, therefore, can be adapted to use transparent films, with direct lighting, as well as opaque ribbons, with reflected lighting. A new application will be filed by me, with adequate drawings and disclosures covering the use of my invention for the projection of moving pictures by the use of a plurality of transparent films.

With the suggested employing of more than two rollers, still further economical results may be attained. Of course, if more than two rollers are employed, corresponding openings 11 and lenses 12 must also be provided so as to focus the pictures on all the ribbons within the same area on the screen 69.

For preventing the light rays from being reflected from the front of the shutter 52, its front surface is preferably dull and black, and the whole front face of the framework 13 as well as the fronts of the backing elements 15 may be of the same appearance.

I claim:
1. In an optical projection device comprising a casing provided with a plurality of lenses therein, ribbons having sets of characters thereon and being adapted to move substantially vertically back of the respective lenses, the lenses being so arranged that the rays passing therethrough are focused at a predetermined distance from the ribbons; a backing element for each ribbon; guides at the sides of the backing element for guiding the respective ribbon over the backing element; paired, tensioned rollers for feeding each ribbon over the respective backing element, one pair of rollers being adapted to feed the respective ribbon faster therebetween than the other pair of rollers therefor; means for adjusting the tension of each pair of rollers so as to maintain the ribbon under a suitable tension for preventing wrinkling or breakage of the ribbon; means for intermittently rotating the rollers for each ribbon so as to move a ribbon toward a position for exposing a set of characters while the other rollers are motionless and thereby hold a ribbon so that a set of characters thereon is in an exposure position; light means mounted in the casing that the rays therefrom are prevented from passing directly through the lenses; and means for reflecting the light rays upon the ribbons and causing the set of exposed characters illuminated thereby to be projected through the respective lenses upon a suitable surface at the focus of the light rays.

2. In an optical projection device comprising a casing provided with a plurality of lenses therein, ribbons having sets of characters thereon and being adapted to move substantially vertically back of the respective lenses, the lenses being so arranged that the rays passing therethrough are focused at a predetermined distance from the ribbon; a backing element for each ribbon; guides at the sides of the backing element for guiding the respective ribbons over the backing element; a rotatable operating shaft extending transversely of the ribbons; paired tensioned rollers for feeding each ribbon over the respective backing element, the rollers for each ribbon having intermittent gear connections with the operating shaft so that only one ribbon is moved at one time to an exposure position for a set of characters and so that the ribbons are successively moved to such exposure positions by the rotation of the shaft; a shutter slidably mounted in front of the ribbons and provided with openings adapted to register with the respective ribbons; a cam secured upon the shaft; means connected with the shutter and operating in conjunction with the cam for moving the shutter to or from the registering positions of the openings, only one opening at a time being adapted to be in registering position, and the openings in the shutter being so arranged as to register successively with the ribbons at a time when a set of characters is in the exposure position; light means mounted in the casing so that the rays therefrom are prevented from passing directly through the lenses; and means for reflecting the light rays upon the ribbons and causing the set of exposed characters illuminated thereby to be projected through the respective lenses upon a suitable surface at the focus of the light rays.

CARL WALDEYER.